(12) United States Patent
Adrian (10) Patent No.: US 9,690,335 B2
(45) Date of Patent: Jun. 27, 2017

(54) STORAGE DEVICE STORAGE TRAY

(71) Applicant: Facebook, Inc., Menlo Park, CA (US)

(72) Inventor: Jason David Adrian, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/940,347

(22) Filed: Nov. 13, 2015

(65) Prior Publication Data

US 2017/0139449 A1    May 18, 2017

(51) Int. Cl.
*G06F 1/18* (2006.01)
*G06F 1/20* (2006.01)

(52) U.S. Cl.
CPC ............. *G06F 1/184* (2013.01); *G06F 1/187* (2013.01); *G06F 1/20* (2013.01)

(58) Field of Classification Search
CPC ............. G06F 1/184; G06F 1/187; G06F 1/20
See application file for complete search history.

(56) References Cited

U.S. PATENT DOCUMENTS

| | | | |
|---|---|---|---|
| 6,188,571 B1 | 2/2001 | Roganti et al. | |
| 6,778,387 B2 * | 8/2004 | Fairchild | G11B 33/1426 165/80.3 |
| 7,256,989 B2 * | 8/2007 | Liu | G06F 1/184 312/223.1 |
| 7,394,660 B2 * | 7/2008 | Hidaka | G11B 33/126 361/724 |
| 7,593,221 B2 | 9/2009 | Sheng et al. | |
| 7,719,834 B2 * | 5/2010 | Miyamoto | G06F 1/187 312/223.2 |
| 7,864,519 B2 * | 1/2011 | Lin | G11B 33/128 361/679.33 |
| 8,400,765 B2 * | 3/2013 | Ross | H05K 7/20727 165/104.33 |
| 8,477,491 B1 * | 7/2013 | Ross | H05K 7/20736 361/679.48 |
| 8,913,377 B2 | 12/2014 | Furuta et al. | |

(Continued)

OTHER PUBLICATIONS

Non-Final Office Action mailed Oct. 7, 2016, for U.S. Appl. No. 14/940,367 by Adrian, J., et al., filed Nov. 13, 2015.

(Continued)

*Primary Examiner* — Hoa C Nguyen
*Assistant Examiner* — Keith Depew
(74) *Attorney, Agent, or Firm* — Perkins Coie LLP (57) ABSTRACT

Technology is provided for a storage device storage tray for use with one or more storage devices. The storage device storage tray includes a chassis having at least one storage region and a storage frame positioned in the storage region that is pivotably coupled to the chassis. The storage frame is pivotable between a storage position and an access position whereby a plurality of drive bays can be accessed. The storage frame includes first and second substantially parallel panels and a backplane extending between the first and second substantially parallel panels. A plurality of dividers are positioned between the first and second substantially parallel panels to define a plurality of stack regions, wherein each divider includes a ledge member dividing each stack region into a pair of the drive bays configured to receive a storage device.

19 Claims, 5 Drawing Sheets

(56) References Cited

U.S. PATENT DOCUMENTS

| | | | |
|---|---|---|---|
| 8,991,949 B2* | 3/2015 | Kyle | G06F 1/183 312/223.2 |
| 9,042,094 B2 | 5/2015 | Williams | |
| 9,265,173 B1* | 2/2016 | Jhang | G11B 33/128 |
| 9,361,946 B2 | 6/2016 | Bell | |
| 9,380,722 B2* | 6/2016 | Junkins | H05K 5/0256 |
| 9,437,250 B2* | 9/2016 | Mundt | G11B 33/124 |
| 9,468,127 B2 | 10/2016 | Chen et al. | |
| 2003/0222550 A1* | 12/2003 | Boswell | G06F 1/182 312/223.2 |
| 2004/0130861 A1 | 7/2004 | Beall et al. | |
| 2004/0190266 A1 | 9/2004 | Chung et al. | |
| 2005/0168932 A1 | 8/2005 | Selvidge et al. | |
| 2006/0181845 A1* | 8/2006 | Shah | G11B 33/12 361/679.4 |
| 2007/0014085 A1 | 1/2007 | Meserth et al. | |
| 2008/0158810 A1 | 7/2008 | Liu et al. | |
| 2008/0165490 A1* | 7/2008 | Buckland | G11B 33/128 361/679.33 |
| 2009/0109609 A1* | 4/2009 | Lai | G06F 1/187 361/679.39 |
| 2009/0168325 A1 | 7/2009 | Yeh et al. | |
| 2010/0020438 A1* | 1/2010 | Gross | G11B 33/08 360/97.19 |
| 2010/0277861 A1* | 11/2010 | Roesner | G11B 33/128 361/679.33 |
| 2011/0058328 A1* | 3/2011 | Ajo | G06F 1/187 361/679.33 |
| 2011/0228473 A1* | 9/2011 | Anderson | G02B 6/4452 361/679.58 |
| 2011/0255235 A1 | 10/2011 | Chen et al. | |
| 2012/0113582 A1* | 5/2012 | Hirano | G06F 1/187 361/679.33 |
| 2012/0243170 A1* | 9/2012 | Frink | G06F 1/187 361/679.34 |
| 2013/0120927 A1* | 5/2013 | Wen | G06F 1/187 361/679.39 |
| 2013/0176676 A1 | 7/2013 | Keffeler et al. | |
| 2013/0229766 A1* | 9/2013 | Williams | G06F 1/16 361/679.33 |
| 2013/0229767 A1* | 9/2013 | Ganta Papa Rao Bala | G11B 33/128 361/679.37 |
| 2014/0021836 A1 | 1/2014 | Hou et al. | |
| 2014/0085806 A1 | 3/2014 | Song et al. | |
| 2015/0077924 A1 | 3/2015 | Rauline | |
| 2015/0103482 A1 | 4/2015 | Saito | |
| 2015/0146353 A1* | 5/2015 | MacNeil | G06F 1/187 361/679.02 |
| 2015/0163964 A1 | 6/2015 | Tang et al. | |
| 2015/0271943 A1* | 9/2015 | Peng | H05K 7/1487 361/679.39 |
| 2016/0103469 A1* | 4/2016 | Kyle | G06F 1/16 361/679.58 |
| 2016/0110307 A1 | 4/2016 | Lin | |
| 2016/0132078 A1 | 5/2016 | Shen et al. | |
| 2016/0135322 A1* | 5/2016 | Chen | G11B 33/142 361/679.46 |

OTHER PUBLICATIONS

U.S. Appl. No. 14/940,367 by Adrian, J., et al., filed Nov. 13, 2015.
Final Office Action mailed Apr. 17, 2017, for U.S. Appl. No. 14/940,367, of Adrian, J. filed Nov. 13, 2015.

* cited by examiner

STORAGE DEVICE STORAGE TRAY

TECHNICAL FIELD

This patent application is directed to data storage server configurations and, more specifically, to a storage device storage tray.

BACKGROUND

Traditional storage device storage trays are usually configured to accept 3.5 inch hard disc drives (HDDs). However, as technology has matured, other storage devices, such as 2.5 inch solid state drives (SSDs), are available with higher storage density and lower cost. Thus, in some cases, it may be desirable to upgrade to a different storage device type and/or size. For example, in some cases, it may be desirable to replace 3.5 inch HDDs with 2.5 inch SSDs. In addition, 2.5 inch SSDs are physically smaller than 3.5 inch HDDs, thereby allowing more drives within the same storage tray form factor. Accordingly, there is a need for storage device storage trays that can accept SSDs within the same form factor as the traditional 3.5 inch HDD storage tray.

BRIEF DESCRIPTION OF THE DRAWINGS

Embodiments of the storage device storage tray introduced herein may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A storage device storage tray is disclosed for use with one or more storage devices. In an embodiment, the storage device storage tray includes a chassis having at least one storage region, and a storage frame is positioned in the storage region and pivotably coupled to the chassis. The storage frame defines a plurality of drive bays configured to receive the one or more storage devices, and the storage frame is pivotable relative to the chassis between a storage position and an access position, whereby the drive bays can be accessed when the storage frame is in the access position. The storage frame includes first and second substantially parallel panels and a backplane extending between the first and second substantially parallel panels. A plurality of dividers are positioned between the first and second substantially parallel panels to define a plurality of stack regions, wherein each divider includes a ledge member dividing each stack region into a pair of the drive bays configured to receive a storage device.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
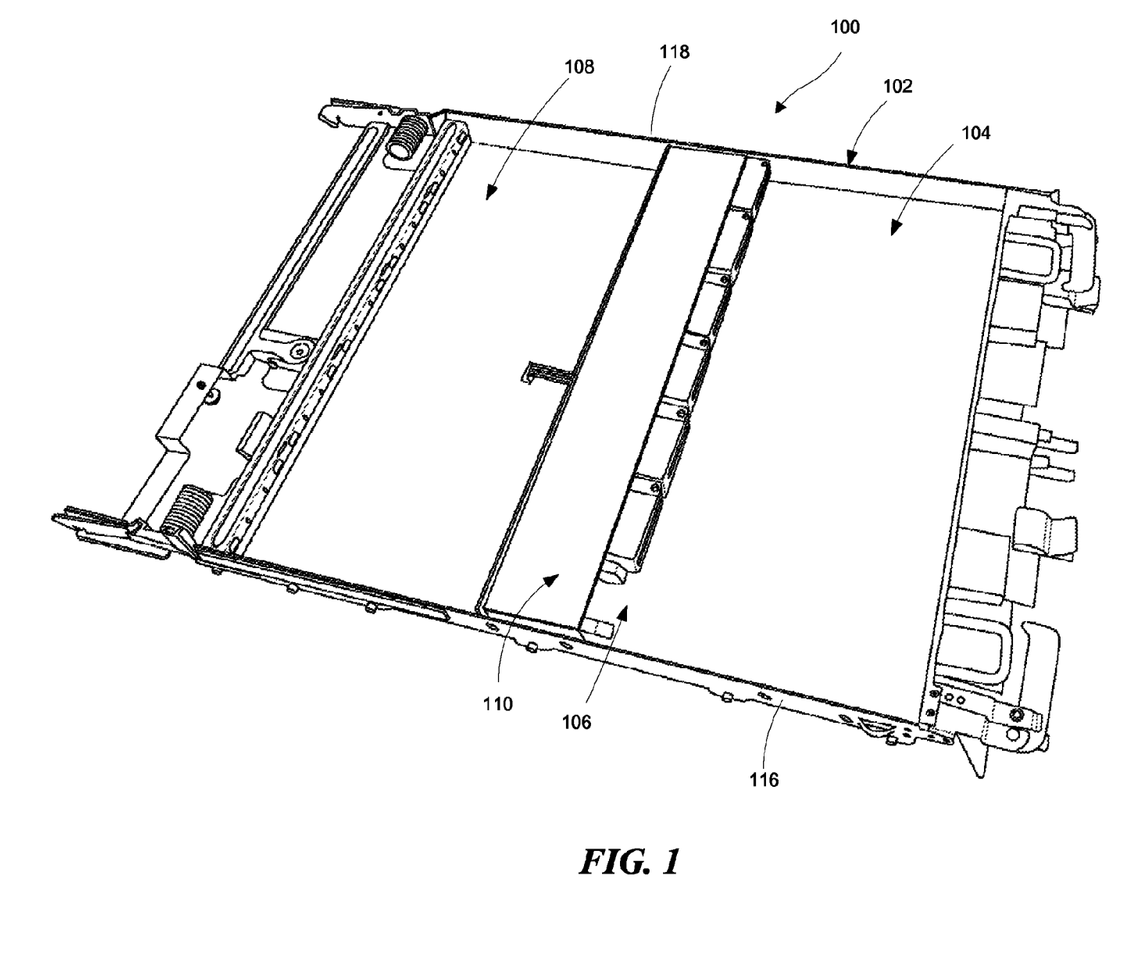
FIG. 1 is a perspective view of a storage device storage tray according to a representative embodiment.
Figure 5:
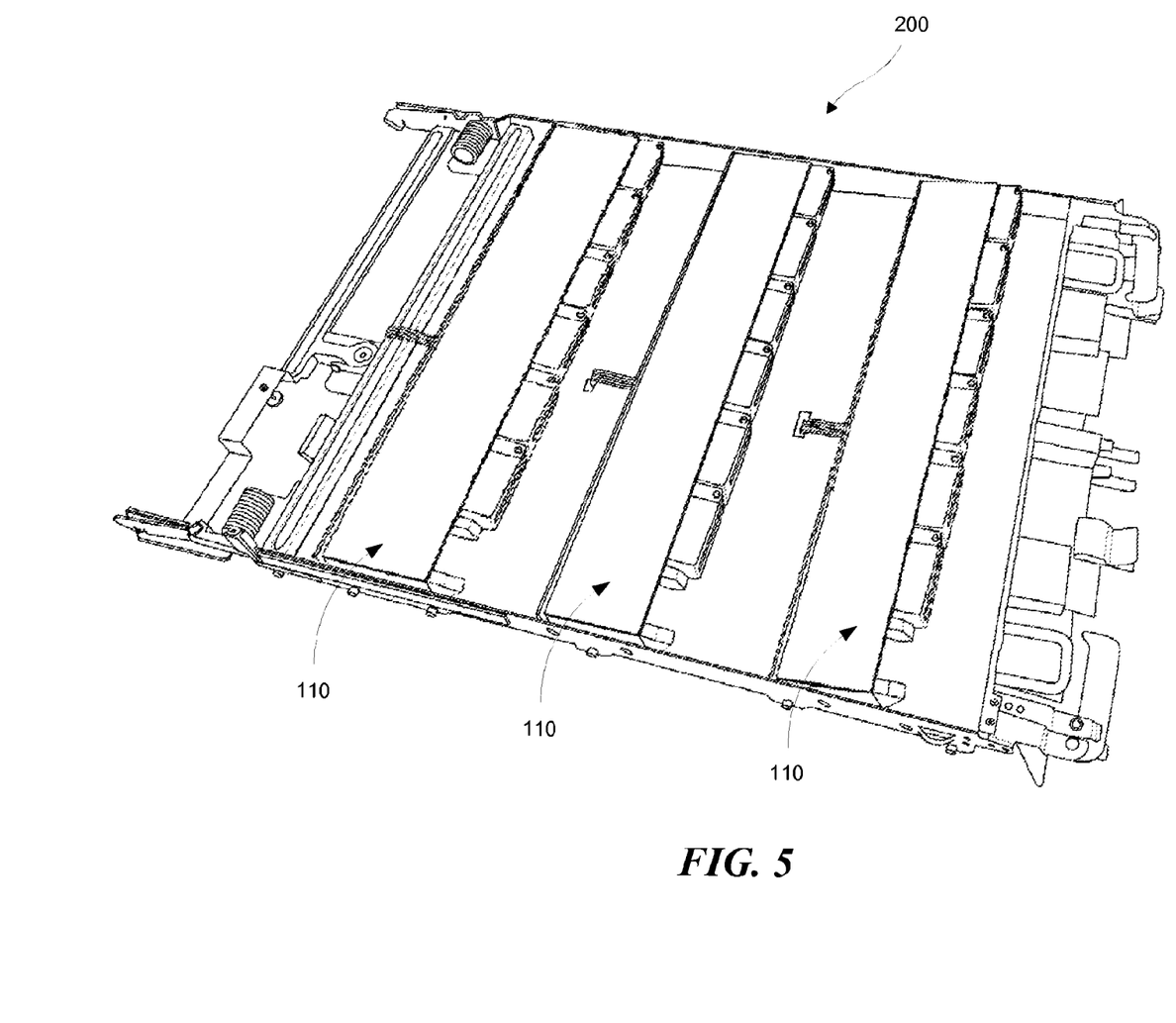
FIG. 5 is a perspective view of a storage device storage tray according to a representative embodiment.

As shown in FIG. 1, the storage device storage tray 100 includes a chassis 102 comprising a pair of opposed sidewalls 116 and 118 and storage regions 104, 106, and 108. A storage frame 110 is positioned in at least one of the storage regions, such as the storage region 106. Although the embodiment depicted in FIG. 1 illustrates a single storage frame 110 positioned in storage region 106, additional storage frames 110 can be positioned in storage regions 104 and 108. For example, FIG. 5 illustrates a storage device storage tray 200 comprising three storage frames 110. A plurality of the storage device storage trays 100 can be removably installed in a sever rack (not shown) for a compact, relatively dense configuration of multiple memory storage devices in a relatively small footprint.

Figure 2:
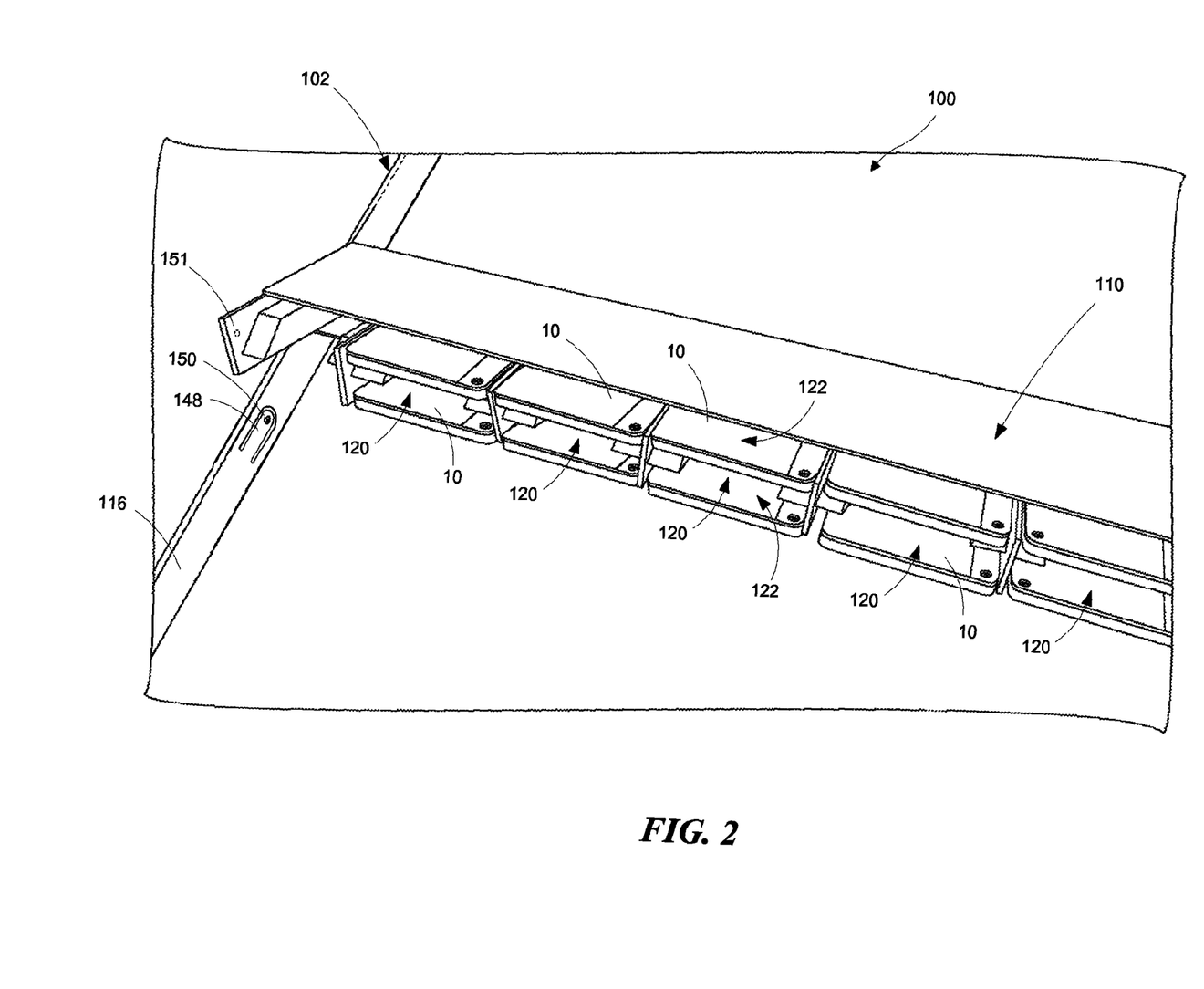
FIG. 2 is an enlarged partial perspective view of the storage device storage tray shown in FIG. 1 with the storage frame positioned in an access position.

With further reference to FIG. 2, the storage frame 110 can be rotated with respect to the chassis 102 between a storage position, as shown in FIG. 1, and an access position, as shown in FIG. 2. When the storage frame 110 is in the access position, one or more conventional storage devices 10 can be easily accessed. The storage frame 110 includes a plurality of stack regions 120, each of which includes a pair of drive bays 122 configured to receive the storage devices 10. In some embodiments, the drive bays 122 are configured to receive 2.5 inch SSDs. Accordingly, the storage frame 110 can contain multiple storage devices 10 in the same form factor as a conventionally sized storage tray. For example, the storage frame 110 can contain 14 2.5 inch SSDs where a conventional storage tray contains only five 3.5 inch HDDs. In some embodiments, the sidewalls 116 and 118 each include a latch 148 to help releasably, yet securely retain the storage frame 110 in the storage position. In the illustrated embodiment, the latch 148 includes a detent protrusion 150 that cooperates with a divot 151 formed in the storage frame 110.

Figure 3:
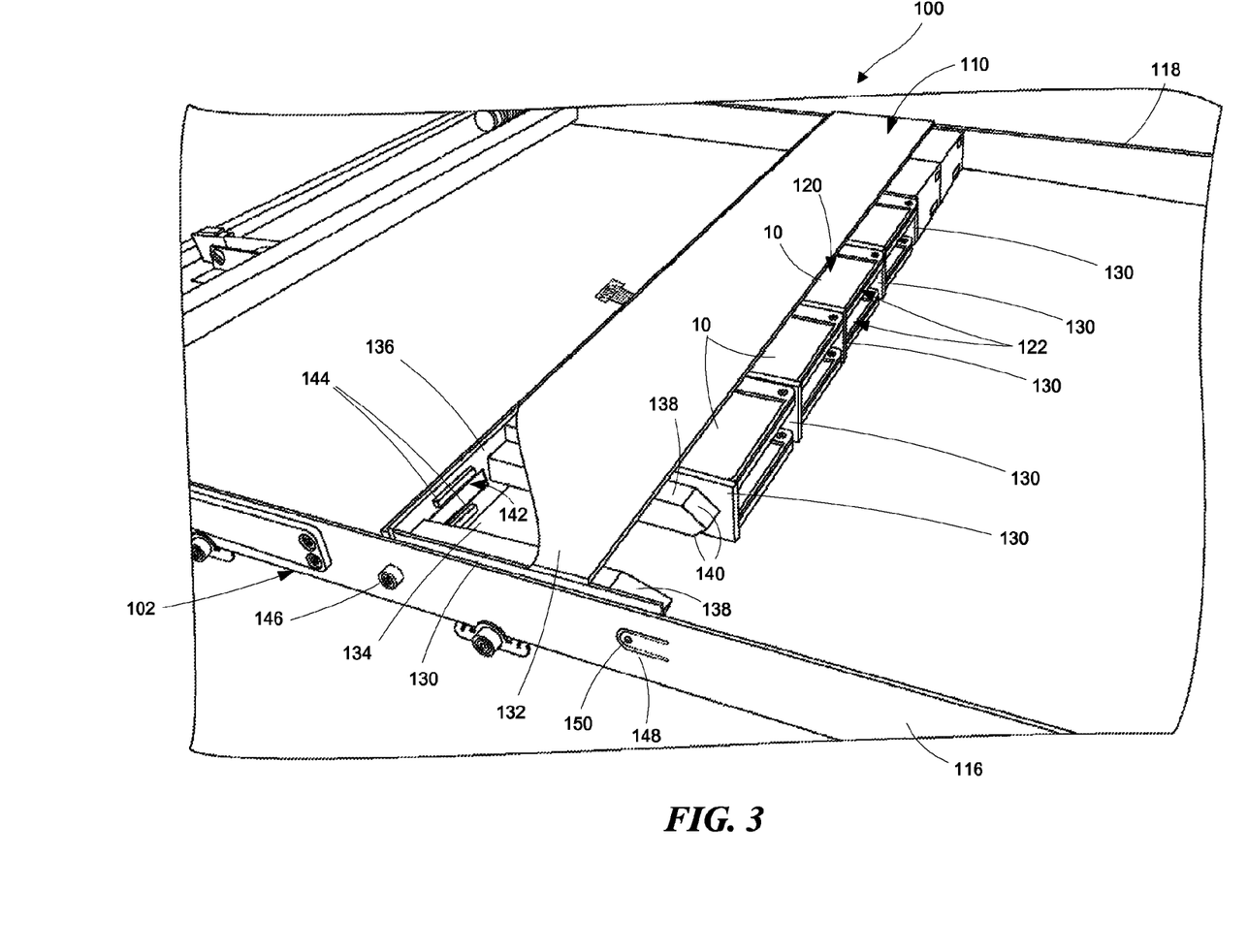
FIG. 3 is an enlarged partial perspective view of the storage device storage tray shown in FIGS. 1 and 2 as viewed from the side of the storage device storage tray.

As shown in FIG. 3, the storage frame 110 includes first and second substantially parallel panels 132 and 134 with a backplane 136, in the form of a printed circuit board, extending between the first and second substantially parallel panels 132 and 134. A plurality of dividers 130 are disposed between the first and second substantially parallel panels 132 and 134 to define the plurality of stack regions 120. In some embodiments, the dividers 130 extend beyond the first and second substantially parallel panels 132, 134. Each divider 130 includes a ledge member 138 dividing each stack region 120 into a pair of the drive bays 122. In some embodiments, the ledge members 138 include lead-in features 140, such as chamfers that can help guide a storage device 10 into or out of a drive bay 122 when the storage frame 110 is in the access position. In some embodiments, the ledge members 138 are comprised of a resilient material, such as foam or rubber, which provides a retaining force to push the storage devices 10 against the first or second substantially parallel panels 132, 134 to snugly hold the storage devices in the drive bay 122. In some embodiments, the distance between the ledge member's surface and the panels 132,134 is less than the thickness of the storage device 10, so the resilient material is compressed when storage device 10 is installed. The resilient material can also be configured so the drive bay 122 can accommodate storage devices that may have different thicknesses, while still securely holding them in place when installed.

The storage frame 110 is pivotably coupled to the chassis 102 by a pair of fasteners 146. The storage frame 110 may be comprised of any suitable material, such as sheet metal or plastic, for example. In some embodiments, the ledge members 138 are integrally formed with the dividers 130. For example, the dividers 130 and the ledge members 138 can be a molded unitary body. In other embodiments, the ledge members 138 can be separately attached to the dividers 130. For example, the ledge members 138 can be bonded or glued to the dividers 130.

The backplane 136 includes a plurality of connectors 144, wherein at least a pair of connectors 144 correspond to each stack region 120, such that each connector 144 is aligned with a respective one of the drive bays 122. Accordingly, two storage devices 10 can be received into each stack region 120 and are connected to a corresponding connector 144. The backplane 136 also includes a plurality of air flow apertures 142 positioned between each of the pairs of connectors 144 that facilitate airflow within the stack region relative to the storage devices. The backplane 136 with integrated connectors 144 pivots relative to the chassis as the storage frame 110 pivots, such that the storage device 10 can be plugged into the connector associated with the selected drive bay 122 when the storage frame 110 is in the accept position.

Figure 4:
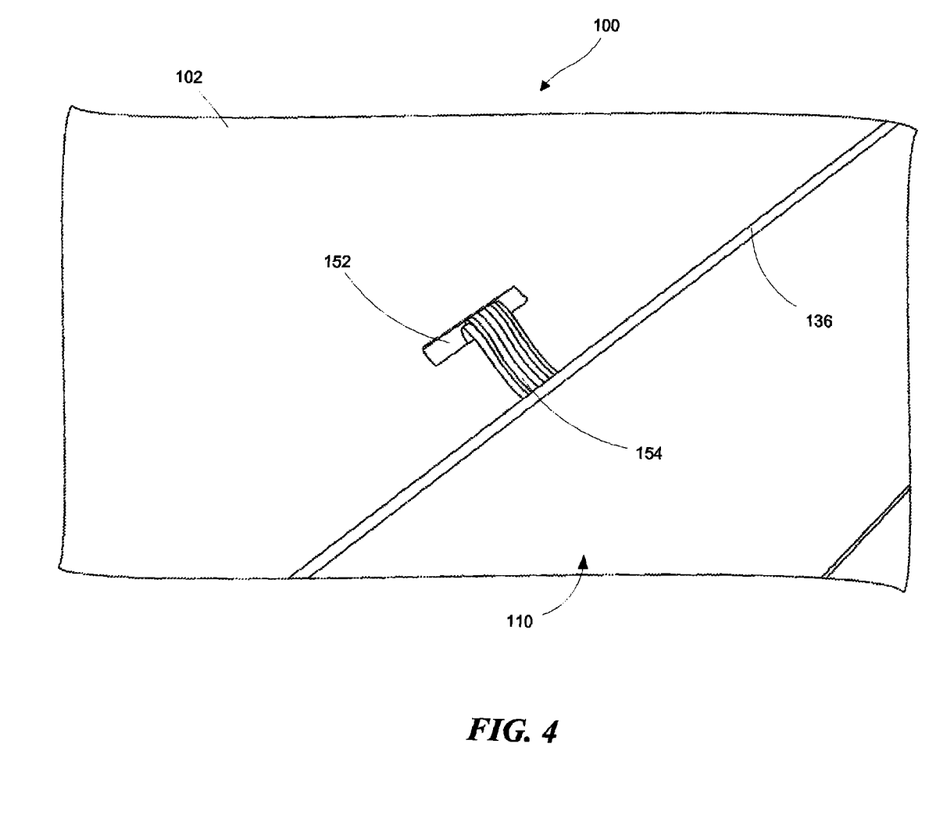
FIG. 4 is an enlarged partial perspective view illustrating the cable interconnecting the backplane and motherboard of the storage device storage tray of FIG. 1.

The storage frame 110 houses multiple storage devices 10 which are ganged together via the backplane 136. In other words, the backplane 136 connects the connectors 144 together for output through a data communication cable 154, as shown in FIG. 4. The backplane 136 is connected to a motherboard 152 via the flexible data communication cable 154 to accommodate pivoting the storage frame 110 with respect to the chassis 102. The motherboard 152 is mounted to chassis 102 to provide network connectivity to the storage devices 10. The motherboard 152 can be connected to a network connection mechanism engageable when the storage device storage tray is inserted into a server rack.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A storage device storage tray for use with one or more storage devices, comprising:
   a chassis including at least one storage region;
   a storage frame positioned in the at least one storage region and pivotably coupled to the chassis, the storage frame comprising:
   first and second substantially parallel panels;
   a backplane extending between the first and second panels; and
   a plurality of dividers extending away from the backplane and positioned between the first and second panels to define a plurality of stack regions, wherein the plurality of dividers extend beyond the first and second substantially parallel panels;
   wherein each divider includes a ledge member dividing each stack region into a pair of drive bays each configured to receive a storage device.

2. The storage device storage tray of claim 1, wherein the backplane includes a plurality of connectors, each connector is aligned with a respective drive bay and positioned to releasably engage a storage device when inserted into the drive bay.

3. The storage device storage tray of claim 2, wherein the backplane includes an air flow aperture positioned between a pair of adjacent connectors.

4. The storage device storage tray of claim 1, wherein the ledge members comprise a resilient material.

5. The storage device storage tray of claim 1, wherein the storage frame pivots relative to the chassis between a storage position and an access position, whereby the drive bays can be accessed when the storage frame is moved to the access position.

6. The storage device storage tray of claim 1, further comprising a motherboard attached to the chassis and operably coupleable to the one or more storage devices via the backplane.

7. The storage device storage tray of claim 6, further comprising a flexible data communication cable interconnecting the backplane and the motherboard.

8. The storage device storage tray of claim 1, wherein the chassis includes a pair of opposed sidewalls, and wherein the storage frame is pivotably coupled to the pair of opposed sidewalls.

9. A storage device storage tray for use with one or more storage devices, comprising:
a chassis including at least one storage region;
a motherboard attached to the chassis;
a storage frame positioned in the at least one storage region and pivotable relative to the chassis between a storage position and an access position, the storage frame comprising:
first and second substantially parallel panels;
a backplane extending between the first and second substantially parallel panels and operably coupleable to the one or more storage devices;
a plurality of dividers extending away from the backplane and positioned between the first and second substantially parallel panels to define a plurality of stack regions, wherein each divider includes a ledge member dividing each stack region into a pair of drive bays configured to receive a respective one of the one or more storage devices, wherein the plurality of dividers extend partially beyond the first and second substantially parallel panels; and
a data communications cable interconnecting the backplane and the motherboard.

10. The storage device storage tray of claim 9, wherein the backplane includes a plurality of connectors, each connector is aligned with a respective drive bay and positioned to releasably engage a storage device when inserted into the drive bay.

11. The storage device storage tray of claim 10, wherein the backplane includes an air flow aperture positioned between a pair of adjacent connectors.

12. The storage device storage tray of claim 9, wherein the ledge members comprise a resilient material.

13. The storage device storage tray of claim 9, wherein the chassis includes a pair of opposed sidewalls, and wherein the storage frame is pivotably coupled to the pair of opposed sidewalls.

14. A storage device storage tray for use with one or more storage devices, comprising:
a chassis including at least one storage region and a pair of opposed sidewalls;
a motherboard attached to the chassis;
a storage frame positioned in the at least one storage region and pivotably coupled to the pair of opposed sidewalls, the storage frame comprising:
first and second spaced-apart panels;
a backplane extending between the first and second spaced-apart panels;
a plurality of dividers disposed between the first and second spaced-apart panels to define a plurality of stack regions, wherein each divider includes a ledge member dividing each stack region into a pair of drive bays each configured to receive a respective one of the one or more storage devices, wherein the ledge members extend partially beyond the first and second spaced-apart panels; and
a data communications cable interconnecting the backplane and the motherboard.

15. The storage device storage tray of claim 14, wherein at least one of the pair of opposed sidewalls includes a latch to retain the storage frame in a storage position.

16. The storage device storage tray of claim 14, wherein selected ones of the ledge members include a lead-in feature to facilitate inserting the storage device into a corresponding one of the pair of drive bays.

17. A storage device storage tray for use with one or more storage devices, comprising: a chassis including at least one storage region; a storage frame positioned in the at least one storage region and pivotably coupled to the chassis, the storage frame comprising: first and second substantially parallel panels; a backplane extending between the first and second panels; and a plurality of dividers extending away from the backplane and positioned between the first and second panels to define a plurality of stack regions; wherein each divider includes an elongate ledge member dividing each stack region into a pair of drive bays each configured to receive a storage device, each ledge member consisting essentially of resilient foam includes a pair of lead-in features, each corresponding to an associated one of the pair of drive bays.

18. A storage device storage tray for use with one or more storage devices, comprising: a chassis including at least one storage region; a motherboard attached to the chassis; a storage frame positioned in the at least one storage region and pivotable relative to the chassis between a storage position and an access position, the storage frame comprising: first and second substantially parallel panels; a backplane extending between the first and second substantially parallel panels and operably coupleable to the one or more storage devices; a plurality of dividers extending away from the backplane and positioned between the first and second substantially parallel panels to define a plurality of stack regions, wherein each divider includes an elongate ledge member dividing each stack region into a pair of drive bays configured to receive a respective one of the one or more storage devices, each ledge member consisting essentially of resilient foam includes a pair of lead-in features, each corresponding to an associated one of the pair of drive bays; and a data communications cable interconnecting the backplane and the motherboard.

19. A storage device storage tray for use with one or more storage devices, comprising: a chassis including at least one storage region and a pair of opposed sidewalls; a motherboard attached to the chassis; a storage frame positioned in the at least one storage region and pivotably coupled to the pair of opposed sidewalls, the storage frame comprising: first and second spaced-apart panels; a backplane extending between the first and second spaced-apart panels; a plurality of dividers disposed between the first and second spaced-apart panels to define a plurality of stack regions, wherein each divider includes an elongate ledge member dividing each stack region into a pair of drive bays each configured to receive a respective one of the one or more storage devices, each ledge member consisting essentially of resilient foam includes a pair of lead-in features, each corresponding to an associated one of the pair of drive bays; and a data communications cable interconnecting the backplane and the motherboard.

\* \* \* \* \*